US006941261B1

(12) United States Patent
Quinn

(10) Patent No.: US 6,941,261 B1
(45) Date of Patent: Sep. 6, 2005

(54) CAUSE AND EFFECT LOGIC APPLICATION IMPLEMENTATION

(75) Inventor: William Joseph Quinn, West Sussex (GB)

(73) Assignee: General Electric Company, Schenectady, NY (US)

( * ) Notice: Subject to any disclaimer, the term of this patent is extended or adjusted under 35 U.S.C. 154(b) by 600 days.

(21) Appl. No.: 09/681,575

(22) Filed: May 1, 2001

Related U.S. Application Data

(60) Provisional application No. 60/201,001, filed on May 1, 2000.

(51) Int. Cl.[7] ............................ G06F 9/455; G06F 9/00
(52) U.S. Cl. ........................................ 703/27; 715/764
(58) Field of Search ............................ 703/27; 715/764

(56) References Cited

U.S. PATENT DOCUMENTS

| | | | |
|---|---|---|---|
| 5,216,619 A | 6/1993 | Dunbar, Jr. et al. ........... 700/99 |
| 5,715,178 A | 2/1998 | Scarola et al. ............... 702/116 |
| 5,732,192 A | 3/1998 | Malin et al. ..................... 703/2 |
| 5,828,576 A | 10/1998 | Loucks et al. ................. 702/65 |
| 5,862,052 A | 1/1999 | Nixon et al. .................... 713/1 |
| 5,984,511 A | 11/1999 | Vasey-Glandon et al. ....... 703/6 |
| 5,995,916 A | 11/1999 | Nixon et al. ................. 702/182 |
| 6,014,637 A | 1/2000 | Fell et al. ...................... 705/26 |
| 6,014,874 A | 1/2000 | Shima et al. .................. 66/106 |
| 6,032,208 A | 2/2000 | Nixon et al. ................... 710/64 |
| 6,098,116 A | 8/2000 | Nixon et al. .................... 710/8 |
| 6,179,489 B1 | 1/2001 | So et al. ...................... 709/102 |
| 6,185,675 B1 | 2/2001 | Kranich et al. ............. 712/236 |
| 6,198,480 B1 | 3/2001 | Cotugno et al. ............ 345/866 |
| 6,256,773 B1 | 7/2001 | Bowman-Amuah ......... 717/121 |
| 6,448,982 B1 * | 9/2002 | Klapper et al. ............. 345/764 |

OTHER PUBLICATIONS

Amit Paradkar, "On the experience of using cause-effect graphs for software specificaiton and test generation", IBM Press, 1994, 51 pages.*

Khenaidoo Nursimulu, Robert L. Probert, "Cause-Effect Graphing Analysis and Validation of Requirements" IBM Press 1995, 46 pages.*

* cited by examiner

*Primary Examiner*—Kevin J. Teska
*Assistant Examiner*—Dwin M. Craig
(74) *Attorney, Agent, or Firm*—Armstrong Teasdale LLP

(57) ABSTRACT

A method for Cause and Effect application logic implementation includes defining a formal methodology for specification of functional requirements for a target system based upon Cause and Effect notation and function blocks and employing a computer-aided specification tool-set to support capture and validation of functional requirements. The method further includes employing a software module to directly execute Cause and Effect application logic.

50 Claims, 9 Drawing Sheets

FUNCTION BLOCK LOGIC TEMPLATE AND
ASSOCIATED HMI ELEMENTS

| Symbol | Name | Description |
|---|---|---|
| $X_n$ | OR | Input term is or'ed into Gate n |
| $\overline{X}_n$ | INV OR | Input term is inverted and or'ed into Gate N |
| $\&_n$ | AND | Input term is and'ed into Gate n |
| $\overline{\&}_n$ | INV AND | Input term is inverted and and'ed into Gate n |
| $E_n$ | ENABLE | Input term is or'ed with other enables. These terms are used to enable or'ed/and'ed terms of Gate n. If no enable terms are defined then gate is enabled. |
| $\overline{E}_n$ | INV ENABLE | Input term is inverted and or'ed with other enables. These terms are used to enable or'ed/and'ed terms of Gate n. If no enable terms are defined then gate is enabled. |
| $T(NN)_n$ | ONTIMER | Input term is subject to on delay of NN seconds. Timer output is or'ed into group n. |
| $\overline{T}(NN)_n$ | INV ONTIMER | Input term is inverted and subject to on delay of NN seconds. Timer output is or'ed into group n. |
| R | RESET | Input term resets latch. Latch set term has priority. If no reset terms are defined for a gate then gate is non-latching. |
| $\overline{R}$ | INV RESET | Input term resets latch when false. Latch set term has priority. If no reset terms are defined for a gate then gate is non-latching. |

CAUSE & EFFECT INSTRUCTION SET SUMMARY

FIG. 5

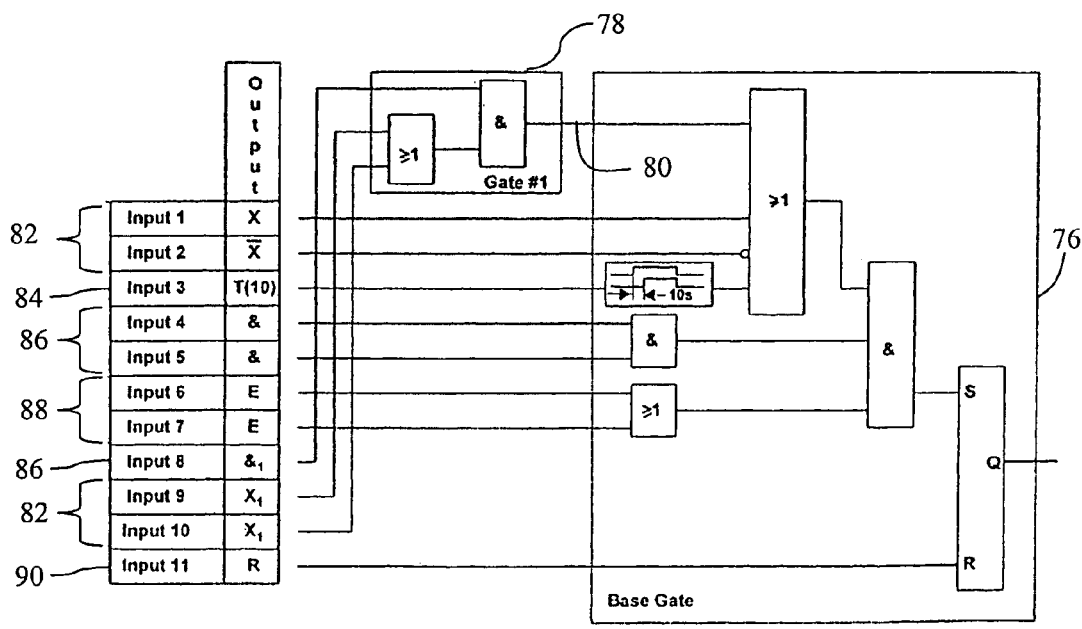

FIG. 6

FUNCTION BLOCK LOGIC TEMPLATE AND
ASSOCIATED HMI ELEMENTS

US 6,941,261 B1

CAUSE AND EFFECT LOGIC APPLICATION IMPLEMENTATION

CROSS REFERENCE TO RELATED APPLICATIONS

This application claims the benefit of U.S. Provisional Application No. 60/201,001, filed May 1, 2000, which is hereby incorporated by reference in its entirety.

BACKGROUND OF INVENTION

This invention relates generally to cause and effect logic application implementation and, more specifically, to specifying functional requirements for cause and effect logic applications.

Some safety related applications utilize cause and effect specifications. However, no recognized international standards apply to definitions used in cause and effect logic. Various industries, companies and individuals adopt their own standards. Additionally, each cause and effect definition includes a corresponding set of cause and effect notations that typically can only express relatively simple combination logic. This inability to express more than simple combination coupled with the aforementioned lack of standards sometimes results in a safety system application logic definition which is ambiguous and hence subject to interpretation error.

SUMMARY OF INVENTION

In one embodiment, a method for Cause and Effect application logic implementation includes defining a formal methodology for specification of functional requirements for a target system based upon Cause and Effect notation and function blocks and employing a computer-aided specification tool-set to support capture and validation of functional requirements. The method further includes employing a software module to directly execute Cause and Effect application logic.

In another embodiment, a computer for Cause and Effect application logic implementation is configured to receive a defined formal methodology for specification of functional requirements for a target system based upon Cause and Effect notation and function blocks. The computer is further configured to capture at least one functional requirement, validate at least one captured functional requirement, and directly execute Cause and Effect application logic.

In yet another embodiment, a database includes data relating to Cause and Effect notation and data relating to at least one Function block.

BRIEF DESCRIPTION OF DRAWINGS

FIG. 5 illustrates a Cause and Effect instruction set.

FIG. 6 illustrates an example of Cause and Effect logic utilizing the Cause and Effect instruction set shown in FIG. 3.

DETAILED DESCRIPTION

Figure 1:
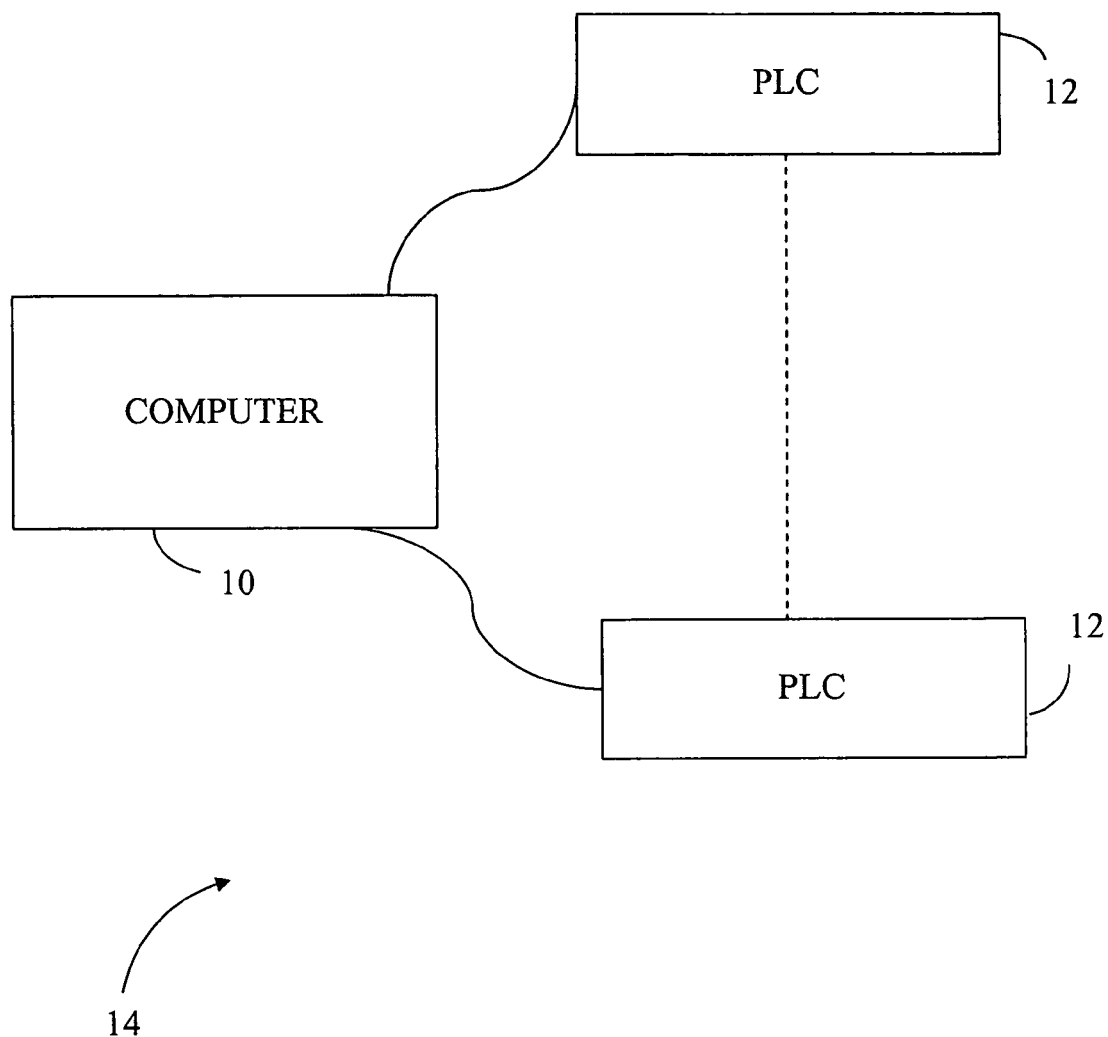
FIG. 1 is a block diagram of a system.
Figure 2:
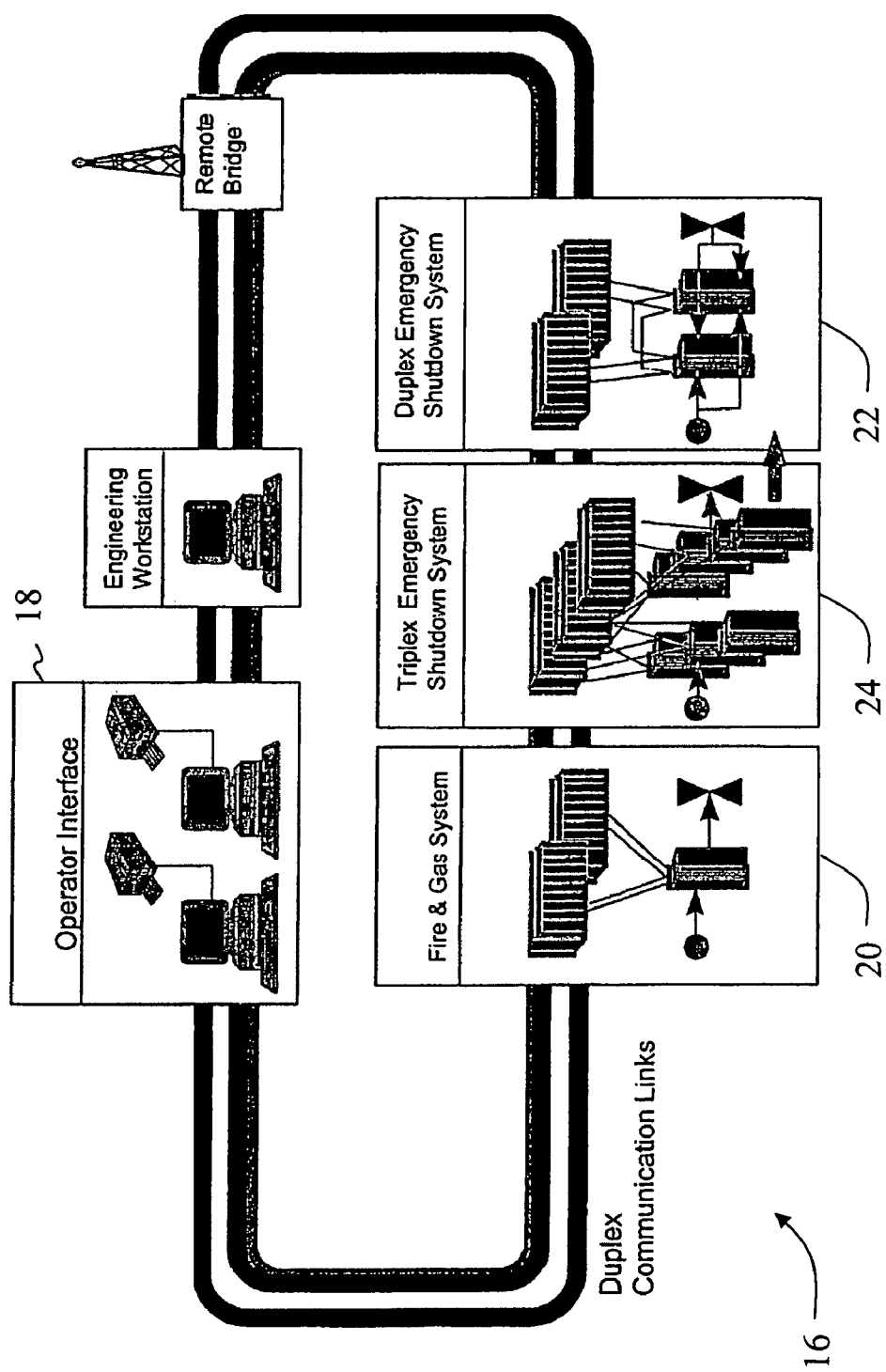
FIG. 2 is a block diagram of an exemplary safety system.

There is herein provided a formal methodology for implementation of cause and effect application logic in a safety-related application for a programmable logic controller (PLC) system. It is contemplated that the benefits of the present invention accrue to all implementations of cause and effect application logic including implementations in non-safety related applications for systems other than PLC systems. As shown in FIG. 1, the method utilizes at least one computer 10 in communication with at least one PLC 12 forming a system 14. As shown in FIG. 2, an exemplary safety system 16 includes an HMI (Human Machine Interface) 18, a Fire and Gas protection system 20, a duplex Emergency Shutdown System 22 and a triplex Emergency Shutdown System 24. As used herein, the term computer is not limited to just those integrated circuits referred to in the art as computers, but broadly refers to computers, processors, microcontrollers, microcomputers, application specific integrated circuits, and other programmable circuits. In one embodiment, the PLCs are accessible to the computer via a network such as an intranet or the Internet. In an alternative embodiment, the PLC is directly connected to the computer. In another embodiment, the PLCs and the computers are interconnected to a network, such as a local area network (LAN) or a wide area network (WAN), through many interfaces including dial-in-connections, cable modems and high-speed ISDN lines.

Figure 3:
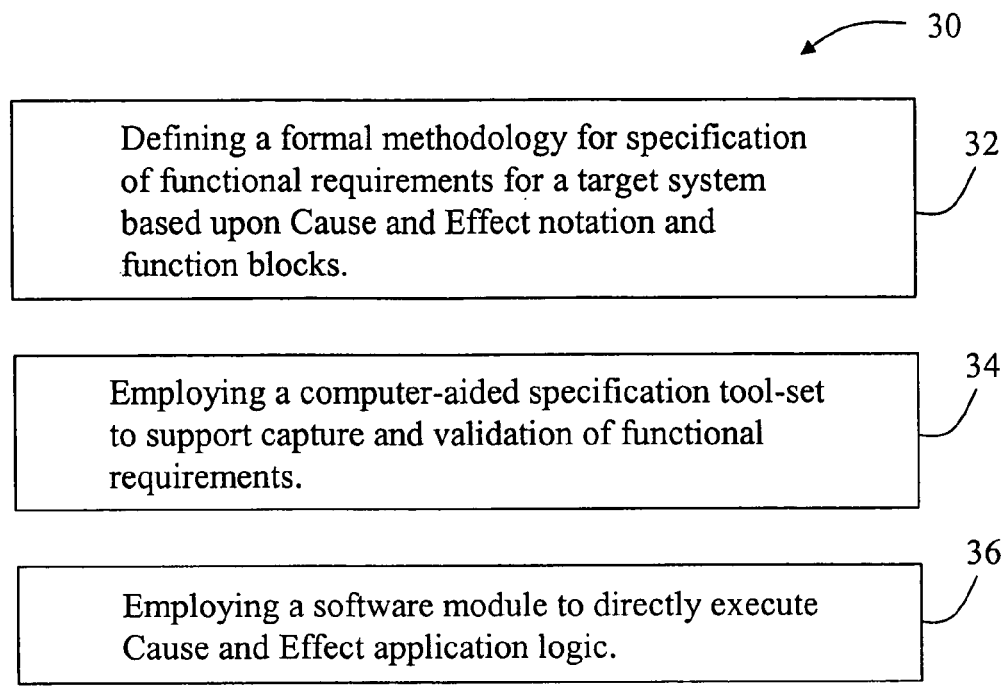
FIG. 3 is a flow chart for one embodiment of a method for Cause and Effect application logic implementation.

FIG. 3 is a flow chart for one embodiment of a method 30 for Cause and Effect application logic implementation. Method 30 includes defining 32 a formal methodology for specification of functional requirements for a target system based upon Cause and Effect notation and function blocks. Method 30 further includes employing 34 a computer-aided specification tool-set to support capture and validation of functional requirements and employing 36 a software module to directly execute Cause and Effect application logic.

As explained in greater detail below, a user defines 32 a formal specification for a particular application and specifies at least one requirement according to the defined formal methodology. The user employs 34 a computer-aided specification tool-set which captures and validates the specified requirements. The user also employs a software module which directly executes the specified requirements. In one embodiment, the software module is an execution engine that is loaded on the target system such as a target PLC system and the engine directly executes the specified requirements without translation. When a user desires to utilize an existing collection of specified requirements on a different target system, the user ports the engine to the new device and the application specification (i.e. collection of specified requirements) remains the same. Accordingly, the different target system is a new device or an upgraded platform for an existing device but the application specification need not be changed. Since, the application specification need not be changed, the new or upgraded platform is functional without the costs associated with changing the application specification.

Figure 4:
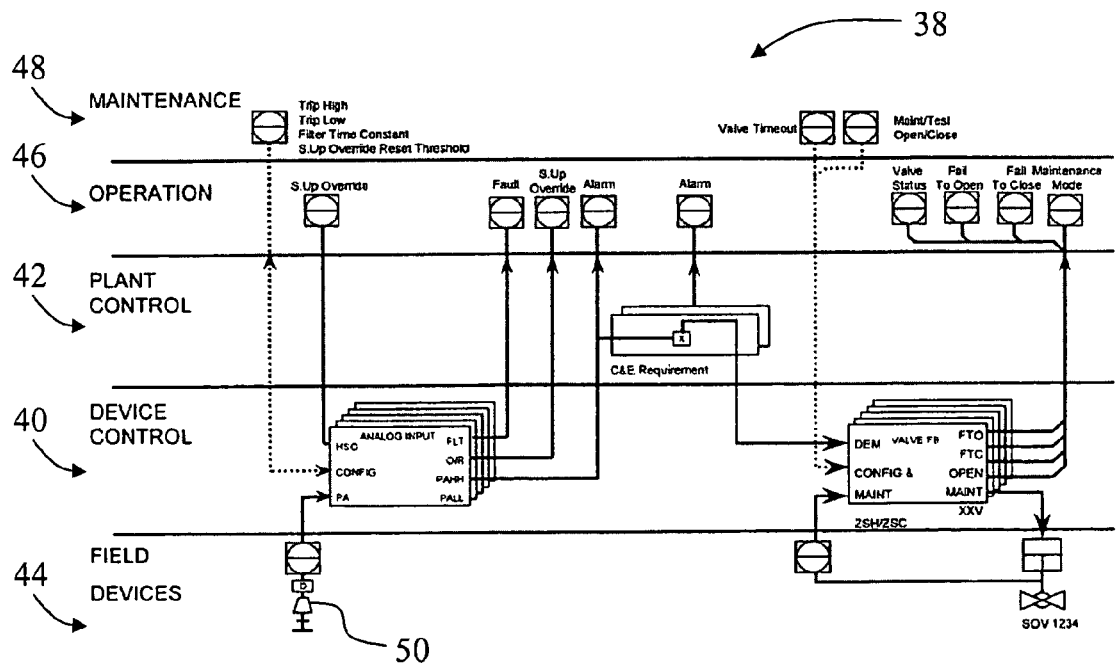
FIG. 4 illustrates dividing functional requirements into a plurality of functional areas.

As illustrated in FIG. 4, method 30 includes dividing functional requirements into a plurality of functional areas 38 including a device control area 40 and a plant control area 42. By specifying control requirements of these different functional areas 40 and 42, an overall methodology is simplified and a plant control specification is kept simple. Additionally, dividing the functional requirements facilitates results that closely resemble American Petroleum Institute standards such as API 14C Safe Chart definitions, which have been used by safety engineers for many years.

After dividing functional requirements of the target PLC system into functional areas 38, method 30 further includes defining logic requirements for both device control 40 and function control 42. In one embodiment, the logic requirements for device control 40 include controlling and/or monitoring a particular type of field device 44 in the target PLC system and the requirements are defined by a re-usable device control function block (not shown in FIG. 4). When a device control function block is defined for a specific field device, then that particular block is used throughout a safety system specification wherever another of that specific device needs to be controlled. Functional areas 38 are associated with at least one operational requirement 46 and at least one maintenance requirement 48 which are initially addressed during defining 12 formal methodology for a target system 50.

FIG. 5 illustrates a Cause and Effect instruction set 52 including a plurality of logic symbols 54 utilized by an user to specify Boolean logic requirements. Logic symbols include an OR symbol ($X_n$) 56, an INV OR symbol ($\overline{X}_n$) 58, an AND symbol ($\&_n$) 60, and an INV AND symbol ($\overline{\&}_n$) 62. Logic symbols 54 further include an ENABLE symbol (E) 64, an INV ENABLE symbol ($\overline{E}_n$) 66, an ONTIMER symbol (T(NN)$_n$) 68, an INV ONTIMER symbol($\overline{T(NN)}_n$) 70, a RESET symbol (R) 72, and an INV RESET symbol ($\overline{R}$) 74.

As explained below, Cause and Effect instruction set 52 is utilized in Cause and Effect charts together with Cause and Effect control function blocks (not shown in FIG. 3). OR symbol 56 indicates that an input term is or'ed into a gate referenced by the n subscript of $X_n$. INV OR 58 indicates that the input term is inverted and or'ed into the gate. AND 60 indicates that the input term is and'ed into the gate. INV AND 62 indicates that the input term is inverted and and'ed into the gate. ENABLE 64 indicates that the input term is or'ed with other ENABLEs 64. INV ENABLE 66 indicates that the input term is inverted and or'ed with other ENABLEs. ENABLE 64 and INV ENABLE 66 are utilized to enable or'ing (OR 56 and INV OR 58) and and'ing (AND 60 and INV AND 62) for the gate. If ENABLE 64 and INV ENABLE 66 are not defined then the gate is enabled by default. ONTIMER 68 indicates that the input term is subject to an on delay of NN seconds and after NN seconds the input term is or'ed into a group referenced by the n subscript of T(NN)n. INV ONTIMER 70 indicates that the input term is inverted and subject to an on delay of NN seconds and after NN seconds the inverted term is or'ed into the group. RESET 72 indicates that the input term resets a latch. INV RESET 74 indicates that the input term resets a latch when the input term is false. A latch set term has priority and if no reset terms are defined for a gate then that gate is non-latching. Each symbol 54 includes a subscript (n) when referring to a specific gate and does not have a subscript when referring to a base gate (not shown in FIG. 5). Instruction set 52 contains only five separate Boolean instructions (OR 56, AND 60, ENABLE 64, ONTIMER 68, and RESET 72) along with the negative or inverse of those five (INV OR 58, INV AND 62, INV ENABLE 66, INV ONTIMER 70, and INV RESET 74). In alternative embodiments, instruction set 52 includes more than and less than five separate instructions along with their inverses but always contains less than ten separate instructions to impart a limited ability of Cause and Effect notation (instruction set 52) to express anything more complex than simple combinational logic. This limited ability allows for a notation that is easily interpreted by both process/safety engineers and system builders.

Figure 7:
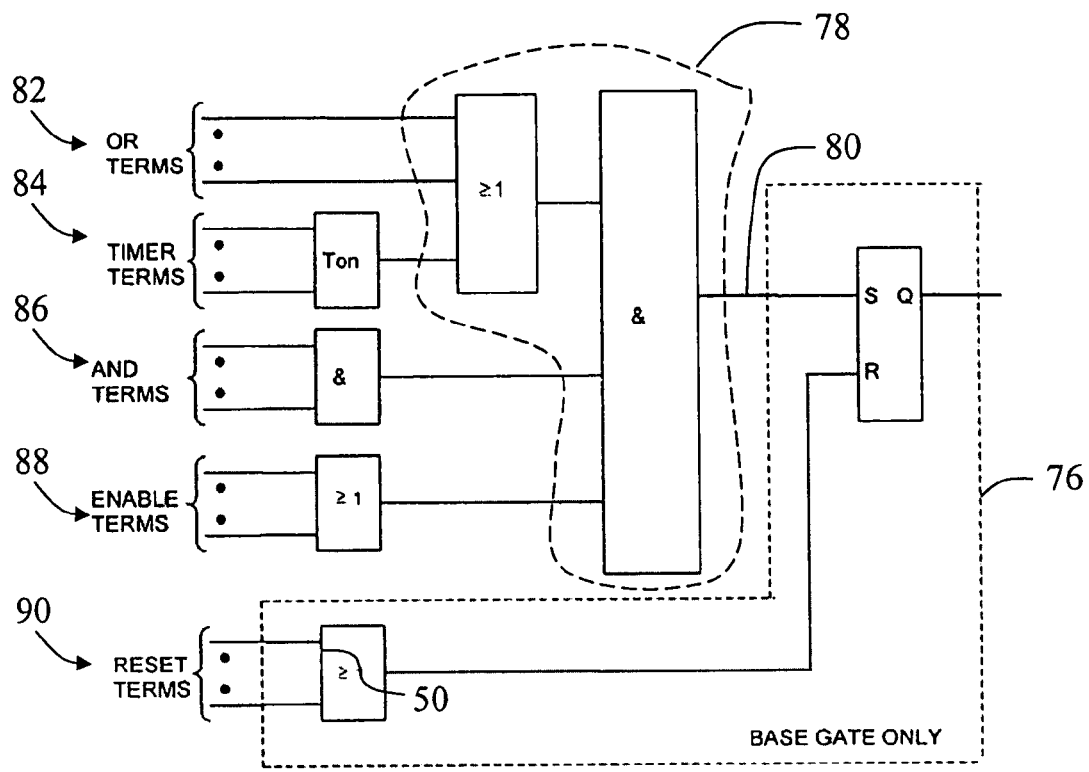
FIG. 7 illustrates a generic example of Cause and Effect logic utilizing the Cause and Effect instruction set shown in FIG. 3.

FIGS. 6 and 7 illustrate examples of Cause and Effect logic utilizing instruction set 52 with a base gate 76 and an input gate 78 including at least one output 80. Logic execution proceeds with outputs 80 from gate 78 feeding in as OR terms into base gate 76 to be solved along with other base gate input terms which include OR terms 82, TIMER terms 84, AND terms 86, ENABLE terms 88, and RESET terms 90. Additionally, as shown in FIG. 6, some AND terms 86 (shown with an &) are sent to base gate 76 and another AND term 86 (shown with an $\&_1$) is sent to input gate 78. Individual gates may or may not include all input terms noted in FIG. 6. Where input terms of a given type are not defined then an associated logic is defeated in such a manner as to allow normal gate function e.g. if no reset terms are defined then the gate is non-latching.

Figure 8:
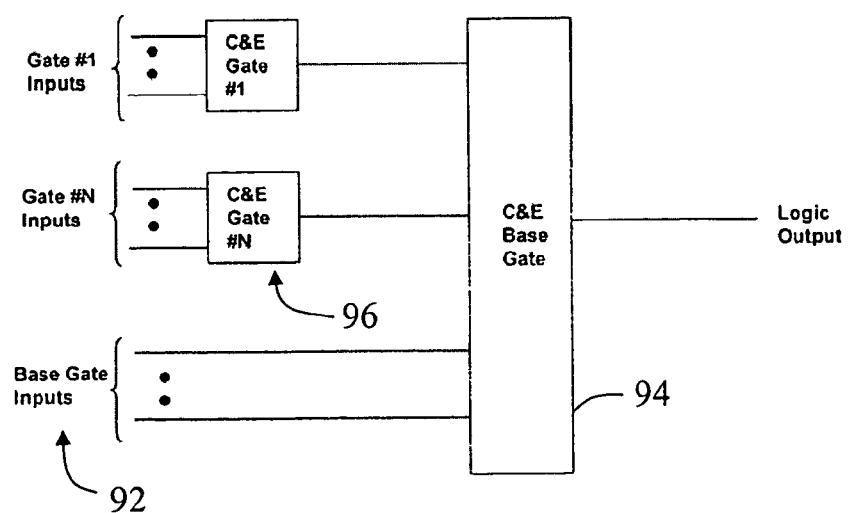
FIG. 8 illustrates that a Cause and Effect gate logic is two-tiered.

Furthermore, as depicted by FIG. 8, the Cause and Effect gate logic is two-tiered in that a plurality of Cause and Effect Gate inputs 92 are provided wherein some of inputs 92 are directly received by a Cause and Effect Base Gate 94 while other inputs 92 are received by a plurality of Cause and Effect Input Gates 96 whose outputs are received by Cause and Effect Base Gate 94. As explained above, the logic operators of Cause and Effect Base Gate 94 have no suffix whereas Cause and Effect Input Gates 96 are denoted by a suffix to the logic term.

Figure 9:
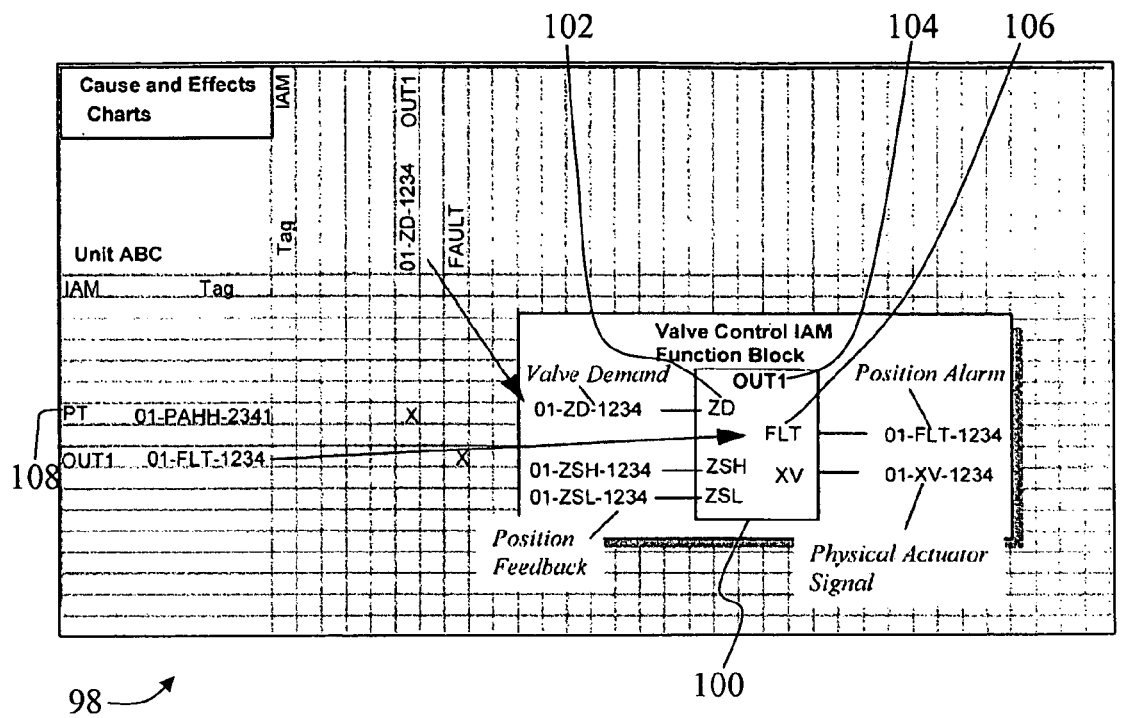
FIG. 9 is a Cause and Effect chart including a device control function block.

FIG. 9 is a Cause and Effect chart 98 including a device control function block 100 which is sometimes referred to as an IAM block for Intelligent Actuation and Measurement. Function block 100 is a complete logic element and includes target system executable logic tags including input signal tags representing alarm states and output signal tags representing shutdown actions for the target PLC system. Additionally function block 100 include Human Machine Interface (HMI) data, operation data, and maintenance data.

Figure 10:
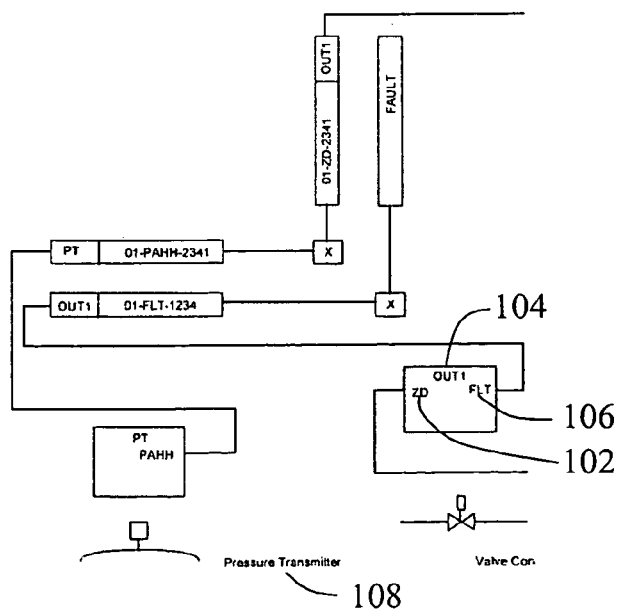
FIG. 10 illustrates the relationship between a device control block and a Cause and Effect chart.

FIG. 10 illustrates the relationship between device control block 100 and Cause and Effect chart 98 shown in FIG. 8. Inputs to function block 100 are set by outputs from Cause and Effect chart 98. For example, a demand result (ZD) 102 for function block 100 is driven by logic within Cause and Effect chart 98. Additionally, outputs of function block 100 are available as inputs to Cause and Effect chart 98. For example, an Out1 104 for function block 100 produces an alarm signal FLT 106 indicating that a valve (not shown) has not moved into a demanded position. Similarly, a pressure transmitter 108 produces a pressure high alarm that is used to control logic within Cause and Effect chart 98.

Figure 11:
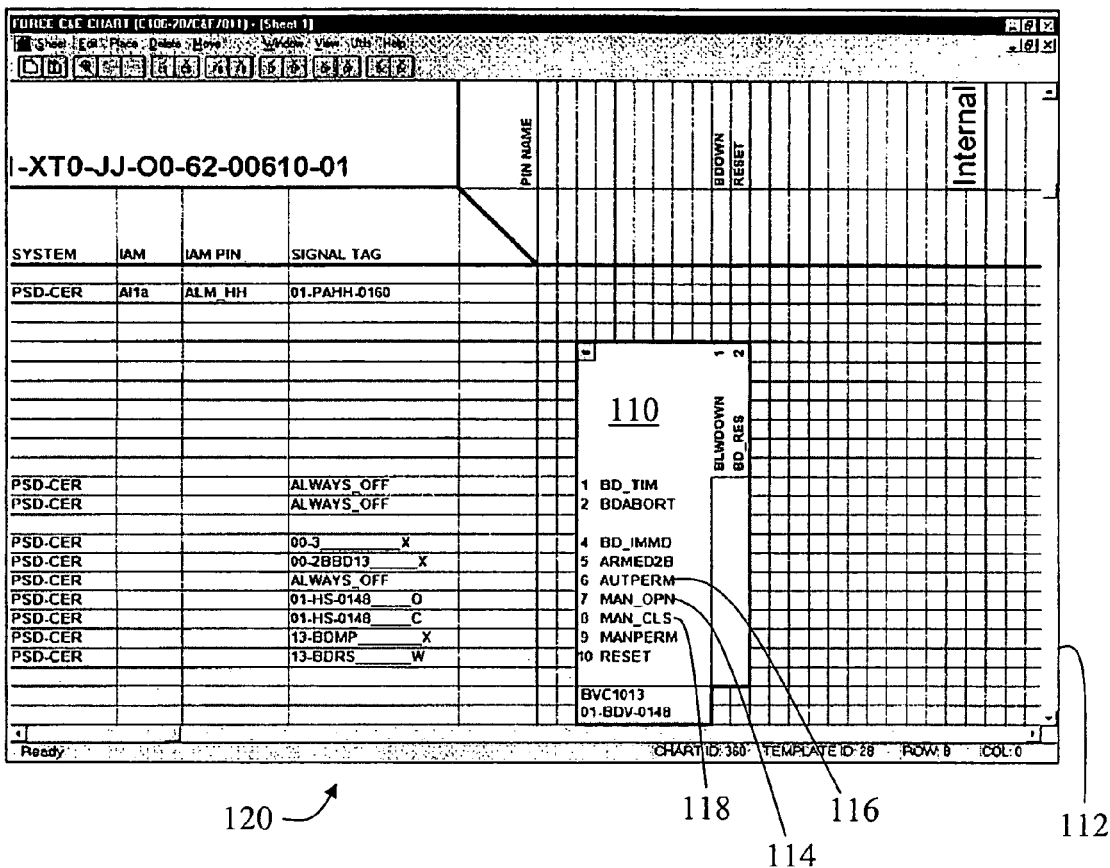
FIG. 11 illustrates a Cause and Effect chart with an embedded Function Block.

FIG. 11 illustrates a Cause and Effect chart 112 with an embedded control function block 110 exemplifying control of a blowdown valve (not shown) that supports manual operation 114, automatic operation 116, and a manual blowdown abort facility 118. Control function block 110 is created with a plurality of inputs and outputs and then placed on Cause and Effect chart 112 and connected to a plurality of input and output tags 120.

Figure 12:
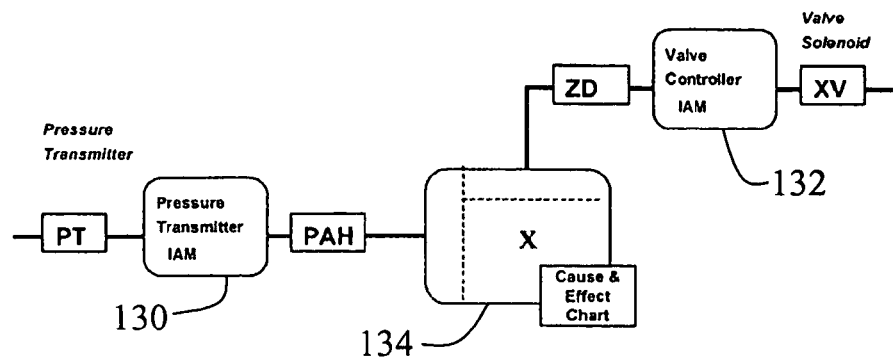
FIG. 12 illustrates the relationship between device control blocks and the Cause and Effect chart.
Figure 13:
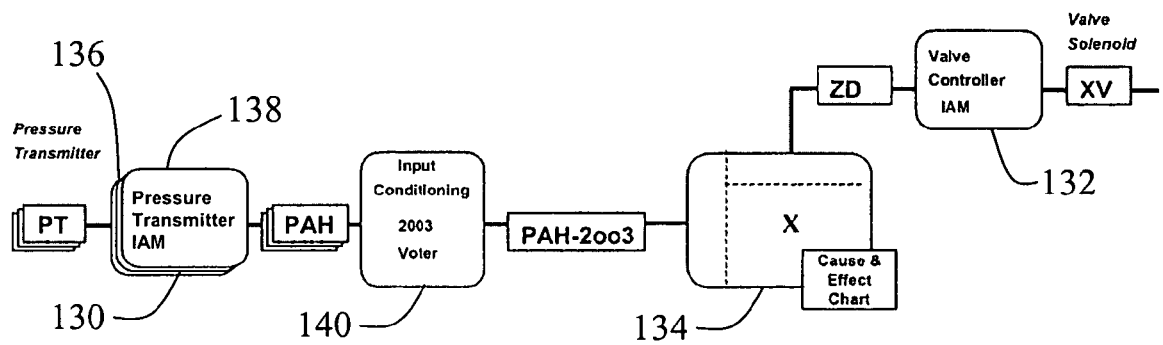
FIG. 13 illustrates the additional relationship between device control blocks, the Cause and Effect chart, and an input conditioning block.

FIG. 12 illustrates the relationship between device control blocks and a Cause and Effect chart 134 Method 30 (shown in FIG. 1) allows a straightforward connection of alarm states from a first Pressure Transmitter IAM 130 to output demands for safety system actuators from a Valve Controller IAM 132 using Cause and Effect chart 134. FIG. 13 illustrates the additional relationship between device control blocks, Cause and Effect chart 134, and an input conditioning block 140. Additionally, FIG. 13 demonstrates how adding a second and third Pressure Transmitter IAMs 136 and 138 does not obscure logic specification and implementation. Pressure Transmitter IAMs 130, 136, and 138 are connected to Cause and Effect chart 134 via Input Conditioning Voter Block 140 such as a 2003 Voting block. Input Conditioning Voter Block 140 is a function block that derives consolidated and/or modified signals from one or more physical or logical inputs. Input Conditioning Voter Block 140 is placed in a separate column in Cause and Effect chart 134 with logical connections to a plurality of pressure transmitter IAM function blocks (not shown). Accordingly, Pressure Transmitter IAM 130, 136, and 138 are all identical and are each associated with identical pressure transmitter IAM function blocks which are connected to Input Conditioning Voter Block 140 in Cause and Effect chart 134 One embodiment of method 30 utilizes an application software package to capture and validate functional requirements for a target PLC system. The application software is capable of developing a database of logic symbols and function blocks (including Cause and Effect instruction set 52 and at least one of a Cause and Effect control function block, a device control function block, and an input conditioning function blocks that are directly implemented using executive software.

The database is initially formatted as a standard database utilizing Cause and Effect instruction set 52 and function blocks with pre-defined executable logic in a manner that is independent of the target PLC system. This standard database is focused on ensuring that the specification is correct and unambiguous, not on the target PLC language set. Since most current PLC platforms support a very similar language set, the effort to implement the function blocks on any specific target PLC is not prohibitive.

The applications software also provides for data import or an on-line definition of field devices. Additionally, the applications software provides for creating new function block templates and user-defined function blocks may be created in any language supported by the target PLC system, for example, ladder diagram, function block diagram (block logic) and Sequential Function Chart (sequences depicted graphically as steps and transitions).

Figure 14:
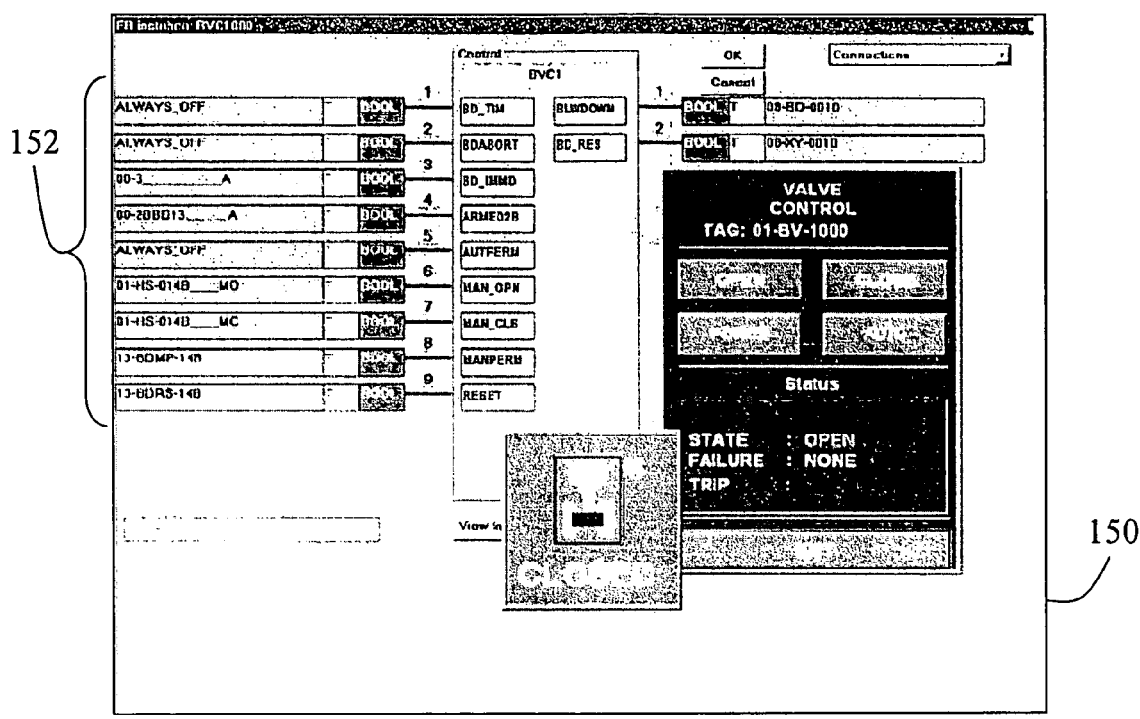
FIG. 14 illustrates a device control function block with an associated HMI system graphical elements.

FIG. 14 illustrates a device control function block 152 with associated HMI system graphical elements 150. An HMI database is automatically populated when the device control function block is created. This population is performed directly on-line if supported by a selected Supervisory Control and Data Acquisition (SCADA) system or a distributed control system (DCS) system or via a generic file import system. Graphical icons and pop-ups associated with the device control function block are automatically generated with certain Windows NT based HMI systems that support Active X technology. Device signal input and output tags are also automatically generated when the function block is created. This use of function block logic significantly reduces error since there is no need to manually link display points to database tags.

When specific logic signals are required in support of an HMI interface (such as Any Alarm in a Unit) then these specified logic signals are generated on Cause and Effect charts dedicated to the HMI interface. HMI requirements include a graphical icon representing the device or control function, an operator control pop-up, a maintenance control pop-up, and an alarm priority and data logging information on a function block signal basis.

The application software is also used to construct a Cause and Effect specification chart from functional requirements of the target PLC system. The Cause and Effect charts utilize a conventional layout for inputs and outputs. To support large designs, each chart includes one or more sheets. Additionally, points that are outputs of charts are used as inputs to the same chart or a different chart. In this way, inter-trips between Unit Shutdown charts or connections to and from Master Shutdown logic are generated.

Dimensions and layout of the specification chart is generally defined once for a project and is then used for all charts. Each column on a Cause and Effect logic chart is used to represent a multi-variable input single output Cause and Effect function. The Cause and Effect charts are constructed by selecting a desired device control block signal tag (e.g. 01-PAHH-1234), from a database held within the applications software program, and placing it on an input and/or an output function chart section as appropriate. Signal identification fields are automatically expanded to define the IAM function block reference (e.g. AI1 for Analogue Input type 1) and a field device tag (01-PT-1234) associated with a cause tag.

The Cause and Effect notation are selected from the applications software database and placed on the chart at an intersection of input signal tags and output signal tags corresponding to a direct connection of alarm states to shutdown actions for the target PLC system. A plurality of Cause and Effect control function blocks are selected from the database and placed on the chart with defined input and output pins of those function blocks connected to input and output signal tags respectively from device control function blocks. HMI interface logic is placed on the Cause and Effect chart and input conditioning function blocks are placed in a separate column on the chart. To enhance integrity, it is not possible to place any input or output signal tag, function block, or symbol on a chart unless it is already defined in the applications software database.

A formal methodology to capture requirements of a safety system's functionality in terms of function block interconnections and Cause and Effect logic notation is provided. Once captured, these requirement specifications are subjected to pre-defined validation rules implemented through the application software. Validation rules include conformance of Cause and Effect notation to specified structure, validity of function block connections and data types, and consistency of defined functional requirements and safety system input/output index.

The application software is also used in modifying a Cause and Effect specification chart post implementation. Any application logic modification required is performed directly on the Cause and Effect chart specifications, which is subsequently be loaded on-line to the target PLC system. Accordingly, documentation and implementation are always equal. The Cause and Effect logic captured on a Cause and Effect chart is directly executed by an executive software package loaded in a target PLC system supported by a database customized and re-validated to the target PLC system. Therefore, no user translation of Cause and Effect logic to the target PLC system is required.

While the invention has been described in terms of various specific embodiments, those skilled in the art will recognize that the invention can be practiced with modification within the spirit and scope of the claims.

What is claimed is:

1. A method for Cause and Effect application logic implementation, said method comprising the steps of:
    defining a formal methodology for specification of functional requirements for a target system based upon Cause and Effect notation and function blocks, wherein said defining includes generating a function block applied to control a target system that cannot be controlled by applying the Cause and Effect notation;
    employing a computer-aided specification tool-set to support capture and validation of functional requirements; and
    employing a software module to directly execute Cause and Effect application logic.

2. A method according to claim 1 wherein said step of defining a formal methodology for specification of functional requirements comprises the step of dividing functional requirements into at least two functional areas including at least one of a device control area and a plant control area.

3. A method according to claim 1 wherein said step of defining a formal methodology for specification of functional requirements comprises the step of dividing functional requirements into at least two functional areas including a device control area and a plant control area.

4. A method according to claim 3 wherein said step of dividing functional requirements comprises the steps of:
    defining logic requirements for device control; and
    defining logic requirements for plant control.

5. A method according to claim 4 wherein said step of defining logic requirements for device control further comprises the step of creating a device control function block that corresponds to at least one field device.

6. A method according to claim 5 wherein said step of creating a device control function block further comprises creating a device control function block comprising target PLC system executable logic in the form of input signal tags representing alarm states and output signal tags representing shutdown actions for a target PLC system.

7. A method according to claim 6 wherein said step of creating a device control function block further comprises the step of creating a device control function block including target PLC system executable logic in the form of input signal tags representing alarm states and output signal tags representing shutdown actions for a target PLC system including at least one HMI requirement, at least one operation requirement, and at least one maintenance requirement.

8. A method according to claim 7 wherein said step of creating a device control function block further comprises the step of creating a device control function block comprising target PLC system executable logic in the form of input signal tags representing alarm states and output signal tags representing shutdown actions for a target PLC system including at least one HMI requirement comprising at least one of a graphical icon representing the device control function block, an operator control pop-up, a maintenance control pop-up, and an alarm priority and data logging information on a function block signal basis.

9. A method according to claim 5 wherein said step of creating a device control function block further comprises the step of using the same device control function block throughout specification of functional requirements of a safety related application for a target PLC system wherever that type of device is controlled.

10. A method according to claim 1 wherein said step of defining a formal methodology for specification of functional requirements of a safety related application for a target PLC system based upon Cause and Effect notation and function blocks further comprises the step of creating at least one input conditioning function block to derive, for at least one input, at least one of a consolidated signal and a modified signal.

11. A method according to claim 4 wherein said step of defining logic requirements for plant control further comprises the steps of:
    using pre-defined Cause and Effect notation; and
    creating a Cause and Effect control function block for each plant control logic function that cannot be described using pre-defined Cause and Effect notation, the Cause and Effect control function block comprising defined input requirements, defined output requirements, operation requirements, and maintenance requirements.

12. A method according to claim 11 wherein said step of creating a Cause and Effect control function block for each plant control logic function that cannot be described using pre-defined Cause and Effect notation further comprises the step of arranging Cause and Effect control function block output demands on an upper side of the Cause and Effect control function block.

13. A method according to claim 7 wherein said step of using pre-defined Cause and Effect notation further comprises the step of using Boolean variables.

14. A method according to claim 13 wherein said step of using Boolean variables further comprises the step of using less than eleven Boolean variables.

15. A method according to claim 1 wherein said step of employing a computer-aided specification tool-set to support capture and validation of functional requirements further comprises the step of employing application software to develop a database of logic symbols and function blocks that are directly implemented using executive software, the database including Cause and Effect notation, Cause and Effect control function blocks, device control function blocks, user-defined function blocks, and input conditioning function blocks.

16. A method according to claim 15 further comprising the step of employing application software to construct a Cause and Effect specification chart.

17. A method according to claim 16 further comprising the step of employing application software to apply pre-defined validation rules.

18. A method according to claim 17 further comprising the step of employing application software to modify the Cause and Effect specification chart post implementation.

19. A method according to claim 15 wherein said step of employing application software to develop a database of logic symbols and function blocks that are directly implemented using executive software further comprises the steps of:
    utilizing a Cause and Effect notation; and
    utilizing at least one function block with pre-defined executable logic for a target PLC system.

20. A method according to claim 19 further comprising the steps of:
    providing for automated creation of an HMI database from the function blocks;
    providing for automated generation of HMI graphic icons from the function blocks;

providing for creation of additional user-defined function blocks specific to functional requirements of the target PLC system that are not found in the database of function blocks; and providing for automated generation of input signal tags and output signal tags from the database of logic symbols and function blocks.

21. A method according to claim 16 wherein said step of employing application software to construct a Cause and Effect specification chart further comprises the steps of:

utilizing a Cause and Effect chart grid layout comprising at least one column that corresponds to an output signal that intersects at least one row that corresponds to at least one input signal;

defining the dimensions of the Cause and Effect chart grid to correspond to functional requirements of a safety related application for a target PLC system;

selecting input signal tags and output signal tags from each pre-defined function block corresponding to functional requirements of the safety related application for the target PLC system;

placing input and output signal tags on the Cause and Effect chart grid;

selecting Cause and Effect notation and at least one Cause and Effect control function block corresponding to at least one function requirement of the safety related application for the target PLC system; and placing Cause and Effect notation on the Cause and Effect chart grid at the intersection of input signal tags and output signal tags corresponding to a direct connection of alarm states to shutdown actions for the target PLC system.

22. A method according to claim 17 wherein said step of employing application software to apply pre-defined validation rules comprises the steps of:

conforming Cause and Effect notation to a specified structure;

validating function block connections and data types; and, verifying consistency of defined functional requirements and safety system input/output index.

23. A method according to claim 1 wherein said step of employing a software module to directly execute Cause and Effect application logic further comprises the steps of:

customizing a standard function block database to correspond to a target PLC system platform;

re-validating the standard function block database to correspond to the target PLC system platform;

loading an executive software package onto the target PLC system;

loading an application software package onto the target PLC system;

loading an executable Cause and Effect chart grid corresponding to function requirements onto the target PLC system; and utilizing the executive software to solve all base Cause and Effect logic gate input requirements.

24. A computer for Cause and Effect application logic implementation, said computer configured to:

receive a defined formal methodology for specification of functional requirements for a target system based upon Cause and Effect notation and function blocks, wherein the function blocks are applied to control a target system that cannot be controlled by applying the Cause and Effect notation;

capture at least one functional requirement;

validate at least one captured functional requirement; and directly execute Cause and Effect application logic.

25. A computer according to claim 24, wherein said computer further configured to receive at least one functional requirement pertaining to at least two functional areas including at least one of a device control area and a plant control area.

26. A computer according to claim 24 wherein said computer further configured to receive at least one functional requirement pertaining to at least two functional areas including a device control area and a plant control area.

27. A computer according to claim 26 wherein said computer further configured to:

receive defined logic requirements for device control; and receive defined logic requirements for plant control.

28. A computer according to claim 27 wherein said computer further configured to generate at least one device control function block that corresponds to at least one field device in a Human Machine Interface (HMI).

29. A computer according to claim 28 wherein said computer further configured to generate at least one a device control function block comprising target PLC system executable logic in the form of input signal tags representing alarm states and output signal tags representing shutdown actions for a target PLC system.

30. A computer according to claim 29 wherein said computer further configured to generate at least one device control function block comprising target PLC system executable logic in the form of input signal tags representing alarm states and output signal tags representing shutdown actions for a target PLC system including at least one HMI requirement, at least one operation requirement, and at least one maintenance requirement.

31. A computer according to claim 30 wherein said computer further configured to generate at least one device control function block comprising target PLC system executable logic in the form of input signal tags representing alarm states and output signal tags representing shutdown actions for a target PLC system including at least one HMI requirement comprising at least one of a graphical icon representing the device control function block, an operator control pop-up, a maintenance control pop-up, and an alarm priority and data logging information on a function block signal basis.

32. A computer according to claim 28 wherein said computer further configured to use the same device control function block throughout specification of functional requirements of a safety related application for a target PLC system wherever that type of device needs to be controlled.

33. A computer according to claim 24 wherein said computer further configured to receive a defined formal methodology for specification of functional requirements of a safety related application for a target PLC system based upon Cause and Effect notation and function blocks further comprises the step of creating at least one input conditioning function block to derive, for at least one input, at least one of a consolidated signal and a modified signal.

34. A computer according to claim 27 wherein said computer further configured to:

display pre-defined Cause and Effect notation; and generate at least one Cause and Effect control function block for each plant control logic function that cannot be described using pre-defined Cause and Effect notation, the Cause and Effect control function block comprising defined input requirements, defined output requirements, operation requirements, and maintenance requirements.

35. A computer according to claim 34 wherein said computer further configured to generate a Cause and Effect control function block for each plant control logic function that cannot be described using pre-defined Cause and Effect notation further comprises the step of arranging Cause and Effect control function block output demands on an upper side of the Cause and Effect control function block.

36. A computer according to claim 30 wherein said computer further configured to display at least one Boolean variable.

37. A computer according to claim 36 wherein said computer further configured to use less than eleven Boolean variables.

38. A computer according to claim 24 wherein said computer further configured to contain a database of logic symbols and function blocks that are directly implemented using executive software, the database comprising Cause and Effect notation, Cause and Effect control function blocks, device control function blocks, user-defined function blocks, and input conditioning function blocks.

39. A computer according to claim 38 wherein said computer further configured to construct a Cause and Effect specification chart.

40. A computer according to claim 39 wherein said computer further configured to apply at least one pre-defined validation rule.

41. A computer according to claim 40 wherein said computer further configured to modify the Cause and Effect specification chart post implementation.

42. A computer according to claim 38 wherein said computer further configured to:
utilize a Cause and Effect notation; and
utilize at least one function block with pre-defined executable logic for a target PLC system.

43. A computer according to claim 42 wherein said computer further configured to:
provide for automated creation of an HMI database from the function blocks;
provide for automated generation of HMI graphic icons from the function blocks;
provide for creation of additional user-defined function blocks specific to functional requirements of the target PLC system that are not found in the database of function blocks; and
provide for automated generation of input signal tags and output signal tags from the database of logic symbols and function blocks.

44. A computer according to claim 39 wherein said computer further configured to:
utilize a Cause and Effect chart grid layout comprising at least one column that corresponds to an output signal that intersects at least one row that corresponds to at least one input signal;
define at least one dimension of the Cause and Effect chart grid to correspond to functional requirements of a safety related application for a target PLC system;
receive selections of input signal tags and output signal tags from each pre-defined function block corresponding to functional requirements of the safety related application for the target PLC system;
generate input and output signal tags on the Cause and Effect chart grid;
receive selections in Cause and Effect notation;
generate at least one Cause and Effect control function block corresponding to at least one function requirement of the safety related application for the target PLC system; and
display Cause and Effect notation on the Cause and Effect chart grid at the intersection of input signal tags and output signal tags corresponding to a direct connection of alarm states to shutdown actions for the target PLC system.

45. A computer according to claim 40 wherein said computer further configured to:
conform Cause and Effect notation to a specified structure;
validate at least one function block connection and data type; and
verify consistency of defined functional requirements and safety system input/output index.

46. A computer according to claim 24 wherein said computer further configured to:
customize a standard function block database to correspond to a target PLC system platform;
re-validate the standard function block database to correspond to the target PLC system platform;
load an executive software package onto the target PLC system;
load an application software package onto the target PLC system;
load an executable Cause and Effect chart grid corresponding to function requirements onto the target PLC system; and
utilize the executive software to solve all base Cause and Effect logic gate input requirements.

47. A database comprising:
data relating to Cause and Effect notation; and
data relating to at least one Function block applied to control a target PLC system that cannot be controlled by applying the Cause and Effect notation.

48. A database according to claim 47 further comprising data relating to Boolean variables.

49. A database according to claim 47 further comprising data relating to an HMI (human machine interface) including at least one HMI graphic icon.

50. A database according to claim 49 further comprising:
data relating to at least one input signal tag; and
data relating to at least one output signal tag.

* * * * *